United States Patent [19]

Hirose et al.

[11] Patent Number: 4,943,968
[45] Date of Patent: Jul. 24, 1990

[54] METHOD OF DISPLAYING EXECUTION TRACE IN A LOGIC PROGRAMMING LANGUAGE PROCESSING SYSTEM

[75] Inventors: Tadashi Hirose, Komae; Kazuo Nakao, Sagamihara; Keiko Shinada, Machida, all of Japan

[73] Assignee: Hitachi, Ltd., Tokyo, Japan

[21] Appl. No.: 156,459

[22] Filed: Feb. 16, 1988

[30] Foreign Application Priority Data

Mar. 4, 1987 [JP] Japan .................................. 62-47535
Mar. 20, 1987 [JP] Japan .................................. 62-63993

[51] Int. Cl.$^5$ .......................................... G06F 11/00
[52] U.S. Cl. ..................................... 371/19; 371/29.1; 364/900
[58] Field of Search .................... 371/19, 29; 364/300, 364/200 MS File, 900 MS File, 191, 192, 193

[56] References Cited

U.S. PATENT DOCUMENTS 3,987,420 10/1976 Badagnani ........................ 371/19 X
4,730,315 3/1988 Saito .................................. 371/19
4,794,529 12/1988 Hirose ............................... 364/300

OTHER PUBLICATIONS

D. C. Solly, "Debugging User Programs On Console-- Less Controller", IBM TDB, vol. 19, No. 10, 3/1977, pp. 3910-3911.

Primary Examiner—Jerry Smith
Assistant Examiner—Robert W. Beausoliel
Attorney, Agent, or Firm—Fay, Sharpe, Beall, Fagan, Minnich & McKee

[57] ABSTRACT

A sequence of calling clauses and all clauses in a procedure that includes the selected clauses are displayed simultaneously, and the present point of execution is displayed being overlapped on the above displays. In particular, the program source list of a procedure being processed is displayed, and the latest execution statuses of the executed terms are graphically displayed around the terms on the displayed program source list.

7 Claims, 9 Drawing Sheets

FIG. 4A p(X) :- r(2,X).        ①  
r(1,X) :- s(X).        ②  
r(2,X) :- t(X),  
          s(X).        ③   (NON-UNIT CLAUSE)  
r(N,X) :- u(X).        ④ t(a).                  ⑤  
u(b).                  ⑥   (UNIT CLAUSE)  
s(a).                  ⑦  
s(b).

? - p(X).              ⑧   (INQUIRY)

X = a  
yes                    ⑨   (SYSTEM RESPONSE)

FIG. 4B like(monkey, banana).  
like(ass, X) :- color(X, red). vegetable(X),  
color(banana, yellow).  
color(apple, red).  
color(carrot, red).

vegetable(carrot).

FIG. 11 PRIOR ART

```
 ?- p(X).
                                                              111
    ┌──────────────────────────────────────────────────────┐
    │  0  CALL      p(X) ?                                 │
    │  0    UCALL   p(X) : p(X) :- r(2,X). ?               │
    │  0    UEXIT   p(X) : p(X) :- r(2,X). ?               │
    │  1  CALL      r(2,X) ?                               │
    │  1    UCALL   r(2,X) : r(1,X) :- s(X). ?             │
    │  1    UFAIL   r(2,X) : r(1,X) :- s(X). ?             │
    │  1    UCALL   r(2,X) : r(2,X) :- t(X),s(X). ?        │
    │  1    UEXIT   r(2,X) : r(2,X) :- t(X),s(X). ?        │
    │  2  CALL      t(X) ?                                 │
    │  2    UCALL   t(X) : t(a). ?                         │
    │  2    UEXIT   t(X) : t(a). ?                         │
    │  2  EXIT      t(X) ?                                 │
    │  2  CALL      s(X) ?  g                              │
    └──────────────────────────────────────────────────────┘
                              112       113
    ┌──────────────────────────────────────────────────────┐
    │    * <LIST OF ANCESTORS> *                           │
    │  * 0    p(X).                                        │
    │  * 1    p(X) :- r(2,X).                              │
    │  * 2    r(2,X) :- t(X), s(X).                        │
    │    2  CALL      s(X) ?  @                            │
    └──────────────────────────────────────────────────────┘
 :- listing(s).   114        114      115
    ┌──────────────────────────────────────────────────────┐
    │    s(a).                                             │
    │    s(b).                                             │
    └──────────────────────────────────────────────────────┘
```

METHOD OF DISPLAYING EXECUTION TRACE IN A LOGIC PROGRAMMING LANGUAGE PROCESSING SYSTEM

BACKGROUND OF THE INVENTION

The present invention relates to the tracing of the execution of a program, and more specifically to displaying the trace of the execution of a program that is described in a logic programming language.

Execution of a program is usually traced to assist the debugging operation. It is therefore desired to be able to easily grasp at any time which part of the program is being executed based upon the trace data that is displayed.

A conventional system for tracing the execution of a program in the logic programming language processing system has been discussed in a journal "PROLOG PROGRAMMING", published by Micro Software Co., 1983, pp. 197-222.

According to the conventional logic processing system, there are independently provided a function (tracing function) for successively displaying which clause was selected as a result of calling a procedure, in order to display the execution status, a function for displaying a sequence of calling clauses to indicate by which clause it was called, and a function for displaying all clauses in the procedure including the selected clauses.

According to the conventional function for tracing the logic programming language program, which one of control points of the term is passed is displayed, i.e., which one of call (CALL), recall (REDO), success termination (EXIT) or fail termination (FAIL) is passed, is displayed successively in the form of a list by a character train together with the procedures and terms that are to be executed (W. F. Clockskin, C. S. Mellish, "PROGRAMMING IN PROLOG" published from Springer-Verlag Berlin, Heidelberg, New York).

FIG. 11 illustrates an example of the execution trace display of the type that belongs to the conventional art in relation to a prolog program shown in FIG. 4A. In this example, in addition to the above-mentioned four points, the control points further include special cases, i.e., unification call (UCALL), unification recall (UREDO), unification success termination (UEXIT) and unification fail termination (UFAIL). Instead of the previously mentioned control points, these additional control points are used for the head term of a sentence. In FIG. 11, numerals at the extreme left end denote levels of the procedures, columns to the right denote control points among the above-mentioned eight kinds of control points that are passed, and the columns on the extreme right side denote terms and the like that are to be executed.

FIG. 11 shows an execution trace display 111 of the case when an interrogation clause "P(x)" is input to a user program of FIG. 4A, a display command 112 of a sequence of calling clauses at that moment, a display 113 of a sequence of calling clauses displayed according to the display command 112, a display command 114 of all clauses in the procedure that is to be called, and a display 115 displayed according to the display command 114. Here, for example, the fourth line indicates that a term r (2, X) requesting the trial of procedure r has passed the CALL point, the fifth line indicates that the head term r (1, X) of a sentence r(1, X):-s(X) of the procedure r has passed the UCALL point, the sixth line indicates that the term has passed the point UFAIL, the seventh line indicates that the head term r (2, X) of a next sentence r(2, X):-t(X), s(X) of the procedure r has passed the UCALL point, the eighth line indicates that the term has passed the UEXIT point, and the ninth line indicates that the second term t(X) of the sentence has passed the CALL point and the procedure t is tried in the next time.

It has already been proposed to surround the terms of a program of the logic language with a box-like figure and to display the change of call and the past execution status for the terms using four sides of the box-like figure (Japanese Patent Application Nos. 195280/1985 and 195848/1985, U.S. patent application Ser. No. 895,954, Registration No. 4,794,529, and European Patent Application No. 86111186.2 that correspond to the above latter Japanese application). These proposals, however, have not yet reached the level for displaying the execution trace.

The conventional execution trace display, call sequence display, and display of all clauses in the procedure to be called, shown in FIG. 11, are not sufficient with regard to the amount of data. However, it is not easy to grasp from the display which portion of the program is being executed. In the program of logic language, furthermore, the back tracking develops so frequently that a simple indication of the present point of execution does not suffice for the requirement. It is necessary to grasp the process that led up to this point which, however, is more difficult to attain.

When the execution status of a program described by the logic language is to be understood from the standpoint of executing the program debugging, it is necessary to grasp not only the result of clause selection of which clause was selected for the calling of procedure but also to grasp (1) the object of clause selection, i.e., which clause was verified by calling the procedure, and (2) the reason for selecting the clause, i.e., why a particular clause was selected but other clauses were not selected.

Display of a sequence of calling clauses is effective for grasping the object of clause selection. Further, the reason of clause selection can be effectively grasped by displaying all clauses in the procedure inclusive of the selected clause while clearly indicating the above selected clause. According to the prior art, however, attention has not been given to the fact that the above two are simultaneously required. The progammer must designate the display of a sequence of calling clauses and the display of the whole procedures, and must determine the correspondence among the data that are independently displayed based upon these designations, causing the efficiency of the program debugging operation to decrease.

Further, the programmer usually describes a program in an easily-to-understand form by effecting indention, starting with a new line and inserting a note within a range permitted by the language specifications, and comprehends the program in this particularly described form. When the debugging is carried out while making reference to the trace display of the form shown in FIG. 11, therefore, many program writers are obliged to separately prepare a program source list output of a type described by themselves, and infer and determine the present point of execution on the program source list and procedure that leads to that point based upon the trace data shown in FIG. 11. The labor required for the inference and decision prevents the debugging operation from being improved.

SUMMARY OF THE INVENTION

The object of the present invention is to provide a method of displaying execution trace in a form which allows the programmer to easily grasp the present point of execution in a program of a logic language and the process up to that point. The above makes it possible to save labor required for the above-mentioned display and designation, to save labor for deciding the correspondence among the displayed data, and to save labor required for the above-mentioned inference and decision, thus enabling the debugging efficiency to be improved.

The above object is achieved by displaying a sequence of calling clauses and further simultaneously displaying all clauses in a procedure that includes the selected clause, and further displaying a present point of execution overlapped on these displays.

In particular, the above object is achieved by displaying a program source list of the procedure that is being processed, and displaying the latest execution status of each of the executed terms graphically around the terms on the displayed program source list.

With the sequence of calling clauses being displayed, it is possible to successively trace in reverse order (up to the final goal input by the user) to find which clause is verified by the clause that is now selected and called. Therefore, the object of selecting the clause can be easily inferred. By displaying all clauses in the procedure inclusive of the selected clause, the selected clause is displayed in parallel with the clauses that are not selected and comparison thereof makes it possible to easily infer the reason of why a particular clause was selected. Moreover, since the above-mentioned two kinds of displays are simultaneously produced, it is allowed to easily infer whether the result of clause selection is proper or not in the light of object of clause selection or, when the clause was not properly selected, to infer the reason why the clause was not properly selected, contributing to improving the efficiency of program debugging operation.

Owing to the above-mentioned means, furthermore, the procedures being processed are displayed in the form by which they are described during the preparation of a program, and the execution statuses reached by the terms that are executed on the display of such a form are simply and graphically displayed in the vicinity of the terms. For example, whether the execution status reached by the terms is calling, recalling, success termination or fail termination after calling, or success termination or fail termination after recalling, is indicated by a side of a four-sided box-like figure surrounding the terms and one of the vertexes. Therefore, the programmer traces the execution status of the terms graphically displayed on the program that is described in a form that can be comprehended most easily by the programmer himself, to easily grasp the present point of execution and the process up to that point.

BRIEF DESCRIPTION OF THE DRAWINGS

FIGS. 4A and 4B is a diagram showing a program by a logic programming language;

FIG. 11 is a diagram showing an example of trace display according to prior art.

DESCRIPTION OF THE PREFERRED EMBODIMENT

An embodiment of the invention will now be described in conjunction with FIGS. 1 to 9.

Figure 2:
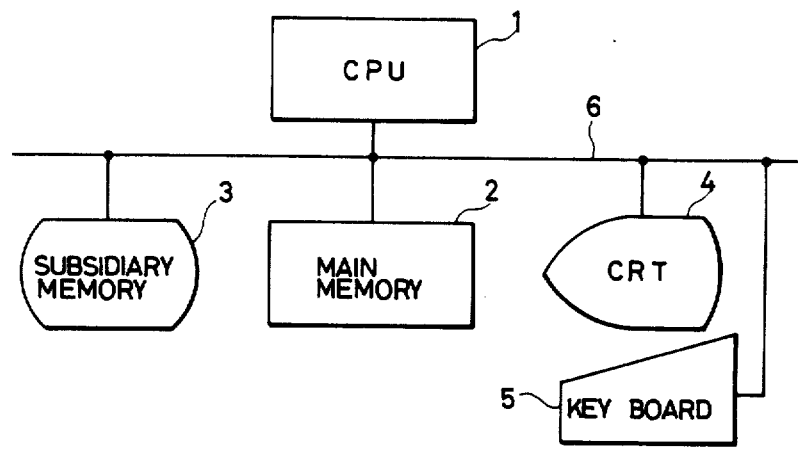
FIG. 2 is a block diagram showing a hardware structure of a data processing apparatus used for the execution according to the present invention.

FIG. 2 illustrates a data processing apparatus for executing an embodiment of the present invention. This apparatus consists of a central processing unit 1, a main memory 2, a subsidiary memory 3, a CRT display device 4, a keyboard 5, and a bus 6 for coupling them together.

Figure 3:
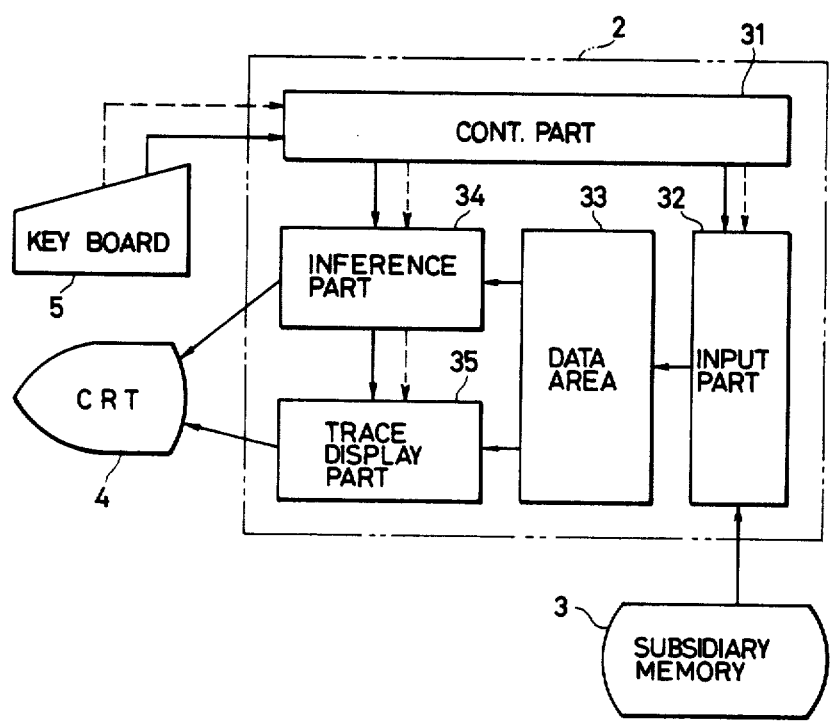
FIG. 3 is a block diagram showing a software structure for carrying out the embodiment of the present invention.

FIG. 3 illustrates a software structure for the apparatus that is shown in FIG. 2, and wherein solid lines represent transmission of data to be treated and dotted lines represent drive control. The software is provided in the main memory. A control part 31 hands inquiry data and user program read instruction input from the keyboard 5 over to an inference part 34 and an input part, respectively, and drives them. In response to the user program read instruction, the input part 32 reads a user program stored in the subsidiary memory 3 onto a data area 33. The data area 33 holds the user program during a period in which it is executed, and further holds a variety of data necessary for executing the inference and execution trace display. In response to the inquiry data, the inference part 34 executes the inference while making reference to the data area 33. A trace display part 35 processes the inference data given from the inference part 34 and the data in the data area 33, and displays the inference execution status, i.e., displays the execution trace data on the CRT display device 4.

Operation of the system will now be described briefly.

The user program is constituted by the list of unit clauses and non-unit clauses exemplified in FIG. 4. In the non-unit clause, the left side of the symbol ":-" is called head and the right side is called body. The body consists of one or more goal terms divided by ",". The head term holds when the goal terms all hold. The unit clause consists of the head only. The head (hereinafter referred to as head term) and the goal term are constituted by a title and subsequent argument terms of a number of zero or greater. A set of unit clauses and non-unit clauses in which the title of the head terms is the same, is referred to as procedure.

Figure 5:
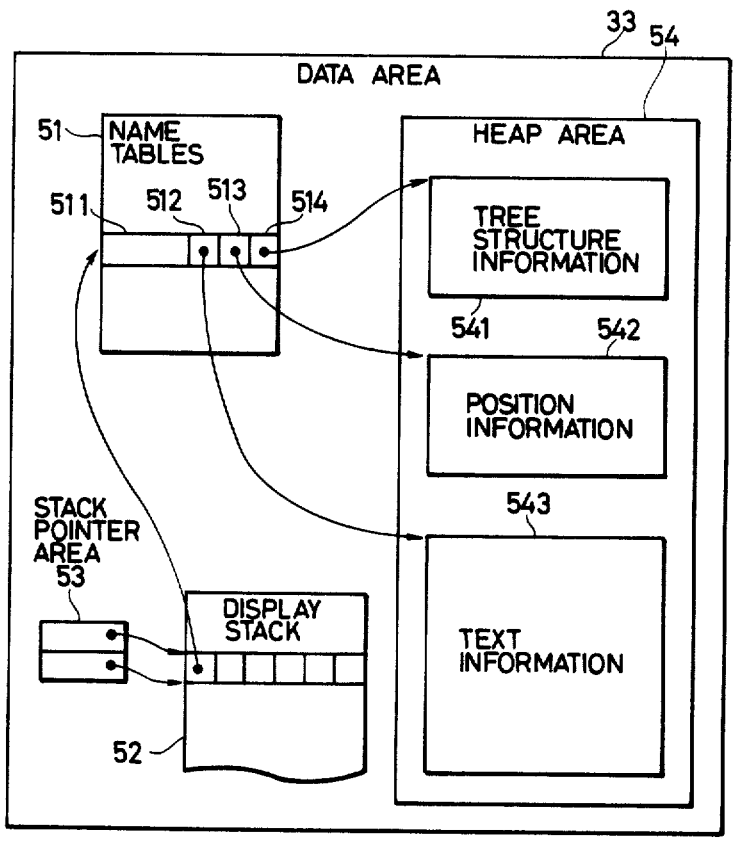
FIG. 5 is a diagram illustrating in detail the data area of FIG. 3.

The user program is stored on the subsidiary memory 23. FIG. 5 illustrates an example of the user program. When the user inputs a program read instruction through the keyboard 5, the user program stored in the subsidiary memory 3 through the input part 32 is read by the internal data area 33.

Execution of the user program is started when the "interrogation" is input by the user through the keyboard 5. The "interrogation" is handed over to the inference part 34 which calls a list (procedure) (hereinafter referred to as "procedure call") of unit clauses and non-unit clauses having the same title as the term of "interrogation" (hereinafter referred to as interrogation term) and searches unit clauses or non-unit clauses having a unifiable head term in the procedure in the order of list. When it is in agreement with the unit clause (referred to as "procedure success"), the character Yes is sent to the CRT 4 together with the value of argument of the interrogation term, and the process is finished. When it is in agreement with the non-unit clause, the procedure call is repeated for each of the goal terms of the body. When the procedure does not contain a clause that is in agreement (referred to as "procedure fail"), the process is returned back to the previous procedure call (referred to as "procedure recall") to find if it is in agreement with a different clause.

The user prepares the user program in advance and stores it in the subsidiary memory 3. FIG. 4 shows a user program described in a prolog, which consists of sentences ① to ⑦. The sentences ① to ④ are non-unit sentences, and the sentences ⑤ to ⑦ are unit sentences. For example, the non-unit sentence ① expresses a rule that the fact indicated by p(X) is true when the fact indicated by r(2, X) is true, and the unit sentence ⑤ expresses the fact that the fact indicated by t(a) is true. The procedure stands for a set of sentences which have the same title of head terms and the same number of arguments. For instance, the sentences ② to ④ constitute a procedure which has the title r and of which the number of arguments is 2. A combination of the title of a procedure and the number of arguments thereof is referred to as procedure name: this word will be used in the following description.

The user instructs the system to read a program consisting of the sentences ① to ⑦ from the subsidiary memory 3, and inputs the inquiry data of the form of the sentence ⑧ through the keyboard 5. The sentence ⑧ expresses the inquiry whether the fact indicated by p(X) is true or not. In response to this inquiry, the system produces a response of a form designated at ⑨. This response ⑨ has a gist that the fact is true when the fact inquired is X=a.

The process for forming a response from the inquiry data is carried out by the inference part 34. The object of the present invention, however, is not to form the response but is to display the execution process of the inference part 34, which is carried out by the trace display part 35. Therefore, the process for forming response by the inference part 34 is not described in detail but, instead, the process of trace display by the trace display part 34 is described below in detail.

For easy comprehension of the operation of the above-mentioned program, attention will now be given to the following eight operations, i.e., procedure call (CALL), procedure success (EXIT), procedure recall (REDO), procedure fail (FAIL), unify call (UCALL), unify success (UEXIT), unify recall (UREDO), and unify fail (UFAIL). They are hereinafter referred to as control points. The inference part 34 drives the display part 35 at a moment when these control points are executed and, at the same time, hands over to it the kinds of control points and the following accessory data depending upon the kinds of control points.

| Kinds of control points | Accessory data |
| --- | --- |
| CALL | P, N, M |
| EXIT | N, M |
| REDO | P, N, M |
| FAIL | N, M |
| UCALL | N, M, K |
| UEXIT | K |
| UREDO | K |
| UFAIL | K |

P denotes the procedure name, N denotes a level of calling clause (a value to indicate which stage of the clause is calling the clause with the interrogation clause as zero), M denotes the position of a goal term in the calling clause (a value indicating the position of the goal term as counted from the head of the clause, the head term being regarded to be zero), and K denotes the position of a clause that is to be unified in the procedure.

First, part of the data in the data area 33 used in the process of trace display will now be described. As shown in FIG. 5, the data area 33 is comprised of a name table 51, a display stack 52, a stack pointer area 53, and a heap area 54. The name table 51 holds pointers to the related data for each of the above-mentioned procedure names (names of procedures and number of arguments). A record is assigned to each procedure name, the record being comprised of a procedure name field 511, a text information pointer field 512, a position information pointer field 513, and a tree structure information pointer field 514.

The heap area 54 holds tree structure information 541, position information 542 and text information 543 designated by the pointers. The tree structure information 541 expresses the tree structure of statements in the user program. This information is obtained by analyzing the syntax of the statements and is chiefly used by the inference part 34. The text information 543 expresses the user program in a form that is described by the user. When the text information is displayed on the CRT, the user program is displayed in the form described by the user, i.e., the program source text is displayed. The position information 542 indicates the positions of terms of sentences in the program source text (hereinafter referred to as text) on the display screen.

Figure 6A:
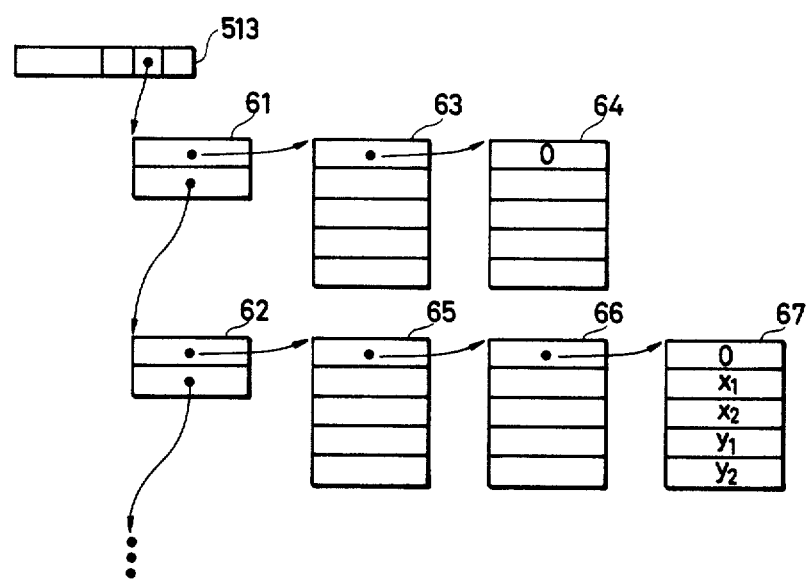
FIG. 6 is a diagram illustrating a position data region in FIG. 5.

FIG. 6A illustrates part of the position information 542 in detail. A sentence node (61, 62) is provided for each of the sentences, and a term node (63 to 67) is provided for each of the terms in the sentences. The sentence node consists of two pointers, the first pointer designating the address of a term node that corresponds to the head term of a corresponding sentence and the second pointer designating the address of a sentence node that corresponds to the next sentence which pertains to the same procedure, and zero is set to the second pointer of the sentence node that corresponds to the final sentence. The content of the position information field 513 of each of the records in the name table 51 (FIG. 5) designates the address of a sentence node that corresponds to a head sentence in the corresponding procedure. Each term node consists of a pointer and four position informations. The pointer designates the address of a term node that corresponds to the next term in the same sentence, and zero is set to the term node that corresponds to the final term. When a text is displayed, the four position informations of each term node indicate positions on the CRT screen (see FIG. 6B) on which the corresponding terms are to be displayed.

Figure 6B:
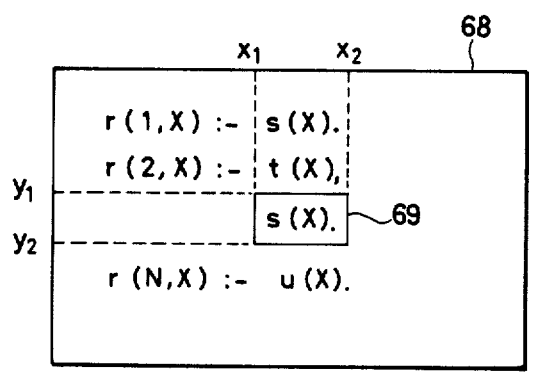

FIG. 6 shows part of the position information that corresponds to the procedure name r (number of arguments is 2) in the program shown in FIG. 4. The procedure consists of three sentences ② to ④, the sentence node 61 corresponds to the first sentence ② and the sentence node 62 corresponds to the second sentence ③. The first sentence ② consists of two terms r(1, X) and s(X) that correspond to term nodes 63 and 64, respectively. The second sentence ③ consists of three terms r(2, X), t(X) and s(X) that correspond to term nodes 65, 66 and 67, respectively. The four position information $x_1$, $x_2$, $y_1$ and $y_2$ of the term node 67 indicate, as shown in FIG. 6B, positions of a box-like FIG. 69 that surrounds the corresponding term s(X) on the CRT screen 68.

Figure 7:
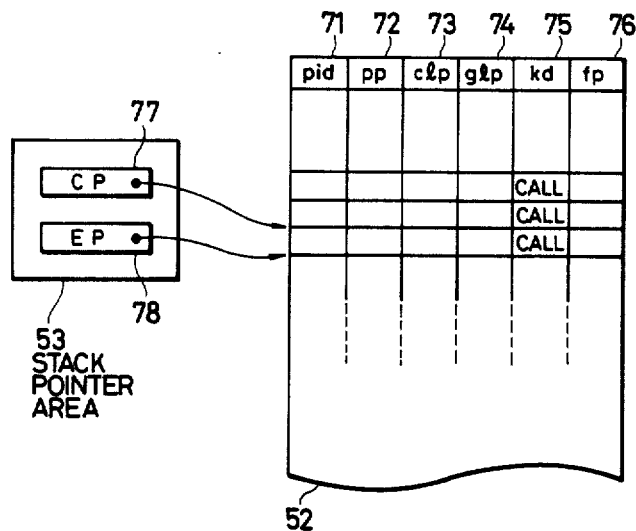
FIG. 7 is a diagram illustrating a display stack and a stack pointer area in FIG. 5.

FIG. 7 illustrates in detail the display stack 52 and the stack pointer area 53. The display stack 52 is a memory region that works as a stack and stores the execution process in the inference part 34 in order to control the display. The records in the display stack 52 correspond to the procedures that are called, each consisting of the following six fields:

pid Field 71: A field which stores a record number (procedure name identifier pid) in the name table 51 for the procedure name.

pp Field 72: A field for storing a pointer (parent pointer pp) to the record in the display stack 52 that corresponds to the procedure of calling source.

clp Field 73: A field for storing a pointer (sentence pointer clp) to the sentence node that corresponds to a sentence being executed in the position information 542 of the procedure.

glp Field 74: A field for storing a pointer (term pointer glp) to the term node that corresponds to a term being executed in the position information 542 of the procedure.

kd Field 75: A field for storing the kinds of the latest control points sent from the inference point 34 in connection with the procedure.

fp Field 76: A field for storing a file number of an output window assigned for displaying on the CRT a part of the procedure of the source text.

The stack pointer area 53 stores a current pointer (CP) 77 and an empty pointer (EP) 78. The current pointer 77 designates the address of a record in the display stack 52 that corresponds to the procedure that is now being executed, and the empty pointer 78 designates the head address of an empty area in the display stack 52.

Figure 8:
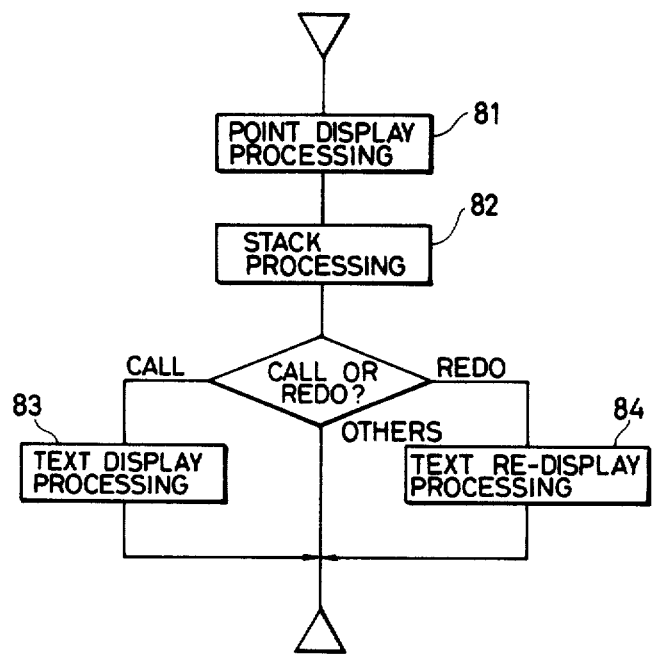
FIG. 8 is a flow chart which schematically illustrates the trace display processing according to the embodiment of the present invention.

At a moment when any one of the eight control points (CALL, EXIT, REDO, FAIL, UCALL, UEXIT, UREDO, UFAIL) is executed for each of the terms, the inference part 34 hands the procedure name and the kind of control point as inference control information over to the trace display part 35 to drive it. The trace display part 35 then carries out the control point display processing 81 and the stack processing 82 as shown in FIG. 8. When the kind of control point is CALL or REDO, the trace display part 35 then carries out the text display processing 83 or the text re-display processing 84. The control point display processing 81 displays on the text the control point of what kind is passed by the processed term based upon the content of the stack record (hereinafter referred to as current record) or the record (hereinafter referred to as parent record) designated by the pp field of the above record that is designated by the current pointer 77 (FIG. 7) and based upon the information of the kind of control point from the inference part 34. The stack processing 82 renews the display stack 52 and the two pointers 77 and 78 based upon the information of the kind of control point from the inference part to make ready for displaying the result of the next processing. The text display processing 83 displays the text of the procedure processed in the next time as a result of CALL processing, and the text re-display processing 84 displays again the text of the procedure that is processed again as a result of REDO processing. These processes will be described below in further detail. Here, however, the stack processing 82 will be described first for the purpose of convenience.

Figure 9:
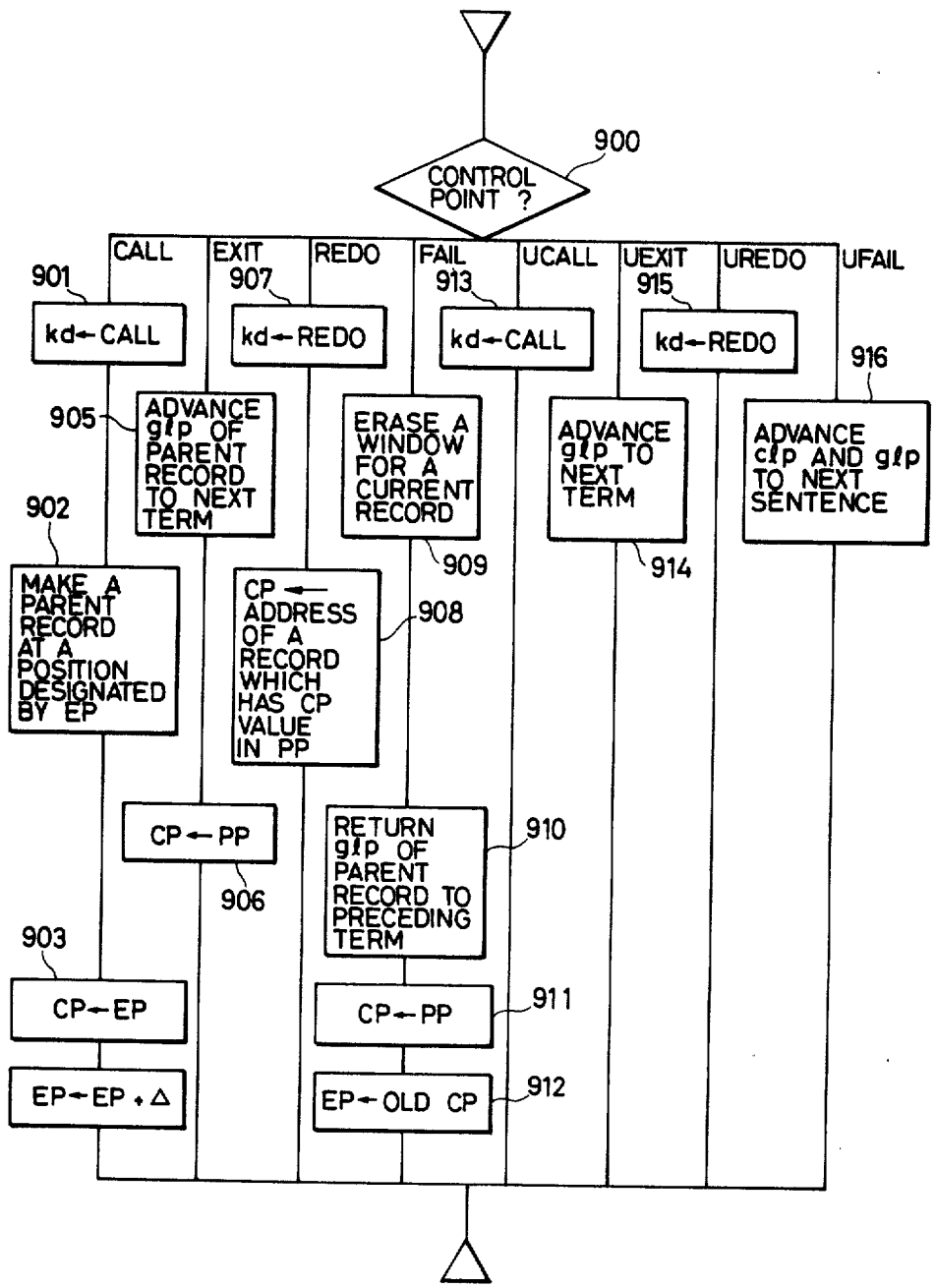
FIG. 9 is a flow chart which illustrates in detail the stack processing of FIG. 8.

FIG. 9 is a flow chart which illustrates the stack processing 82 in further detail. First, the kind of control point in the inference control information received from the inference part 34 is discriminated (process 900). When the kind of control point is CALL, the following processings 901 to 904 are carried out:

(1) Set "CALL" to the kd field of a record (current record) designated by the current pointer 77 (901).

(2) Prepare a new record on a record position designated by the empty pointer 77, and set the field values in the following way (902):

pid = procedure name identifier for the procedure name in the inference control information (a table that shows the correspondence between the procedure names and the procedure name identifiers has been prepared in advance).

pp = a value of the current pointer 77.

clp = a value of the position information pointer field 513 in the name table record designated by the pid, i.e., an address of a first statement node of the corresponding procedure.

glp = a value of a first pointer of the sentence node designated by the clp, i.e., an address of the head term node.

kd = no setting.

fp = a file number of an output window newly assigned to the procedure.

(3) Set a value of the empty pointer 78 to the current pointer 77 (903).

(4) Increase the value of the empty pointer 78 by an amount of one record to designate a new head address of the empty area (904).

When the kind of control point is EXIT, the following processes 905 and 906 are carried out:

(1) Change the glp field of the record (parent record) designated by the pp field of the current record to designate the next term node (905). That is, if the glp value of the parent record is not zero, then set the pointer value (address of the next term node of the same sentence) of the term node designated by the glp value to the glp field. Here, however, if the glp value of the parent record is zero, take out the second pointer (address of the next sentence node) of the sentence node designated by the clp value of this record, set it to the clp field, and set a value of the first pointer of the sentence node designated by the new clp value to the glp field thereby to desingate a head term node of the sentence.

(2) Set the value of the current pointer 77 to a value (address of the parent record) of the pp field of the record that is now being designated (906). When the kind of control point is REDO, the following processes 907 and 908 are carried out.

(1) Set "REDO" to the kd field of the current record (907).

(2) Search the record which has a current pointer value in the pp field tracing from a position designated by the empty pointer 78 through up to a position designated by the current pointer 77, and change the current pointer value so as to designate this record (908).

When the kind of control point is FAIL, the following processes 909 to 912 are carried out.

(1) Erase the window represented by the fp field of the current record (909).

(2) Change the glp value of the parent record so as to designate the preceding term (910). When FAIL develops, the glp value of the parent record never designates the head term node.

(3) Set a value of the current pointer 77 to a pp value of the current record so that the parent record is designated (911).

(4) Set a value of the empty pointer 78 to the old value of the current pointer 77 (912).

When the kind of control point is UCALL, set "CALL" to the kd field of the current record (913).

When the kind of control point is UEXIT, change the glp value of the current record to designate the pointer value of the term node designated by the glp value, i.e., change it to the address of the next term node of the same sentence (914). When the present glp designates the final term node, the pointer value of the term node is zero and the glp value is set to zero.

When the kind of control point is UREDO, set "REDO" to the kd field of the current record (915).

When the kind of control point is UFAIL, change the clp value of the current record to a second pointer value of the statement node designated by the clp value, i.e., to the address of the next sentence node, and change the glp value to a first pointer value of the sentence node designated by the new clp value, i.e., to the address of the head term node of this sentence (916).

After the above-mentioned stack processing is finished, the current pointer indicates a term node that is usually estimated as an object to be processed in the next time, and indicates whether it has passed through the CALL or the REDO in the previous time. When the kind of the control point received from the inference part in the next time is EXIT or FAIL, however, the parent record indicates the object term node and the kind of the control point in the previous time.

Figure 10:
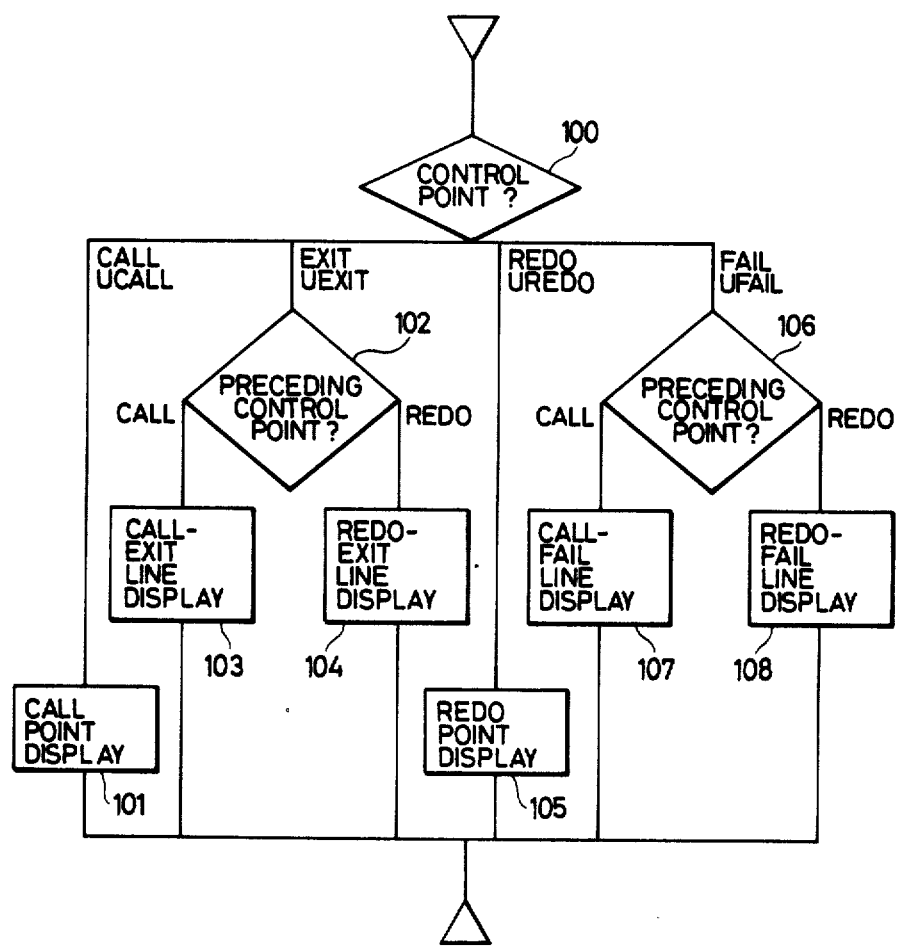
FIG. 10 is a flow chart which illustrates in detail the control point display processing in FIG. 8.

The control point display processing 81 will now be described. FIG. 10 is a flow chart which illustrates the processing 81 in further detail. First, the kind of control point in the inference control information received from the inference part 34 is determined (100). When the kind of the control point is CALL or UCALL, the left upper vertex of the box-like figure that surrounds the corresponding term flashes on the display screen according to position information $(x_1, x_2, y_1, y_2)$ in the term node designated by the glp field of the current record (101).

When the kind of control point is EXIT or UEXIT, the kind of control point of the previous time is examined, first (102). The kind of control point which is EXIT has been recorded in the kd field of the parent record (record designated by the pp field of the current record), and the kind of control point which is UEXIT has been recorded in the kd field of the current record. When the kind of control point in the previous time is CALL, the upper side of the box-like figure surrounding the corresponding term is indicated by a thick line (103) and when the kind of control point in the previous time is REDO, the right side of the box-like figure is indicated by a thick line (104). In the case of EXIT, the position of the box-like figure is designated by the position information in a term node designated by the glp field of the parent record and in the case of UEXIT, the position thereof is designated by the position information in a term node designated by the glp field of the current record.

When the kind of control point is REDO or UREDO, the right lower vertex of the box-like figure surrounding the corresponding term flashes according to the position information in a term node designated by the glp field of the current record (105).

When the kind of the control point is FAIL or UFAIL, the kind of control point in the previous time is examined, first (106). When it is CALL, the left side of the box-like figure surrounding the corresponding term is indicated by a thick line (107) and when it is REDO, the lower side of the box-like figure is indicated by a thick line (108). The kind of control point of the previous time and the position of the box-like figure are obtained from the parent record in the case of EXIT and are obtained from the current record in the case of UEXIT like in the cases of FAIL and UFAIL.

In the text display processing 83, a new window is formed on the screen by making reference to the fp field of the current record (record prepared by the step 902 of FIG. 9) in response to that the kind of control point received from the inference part 34 is CALL. Then, the name table record designated by the pid field is examined, and the text information designated by the text information pointer 512 is selected from the text information 543 and is displayed on the window.

In the text re-display processing 84, the name table record designated by the pid field of the current record (record designated by the current pointer renewed by the step 908 of FIG. 9) is examined in response to that the kind of control point received from the inference part is REDO, and the text information designated by the text information pointer 512 is displayed again on the window designated by the fp field.

The aforementioned embodiment displays texts of all procedures called as the results of CALL and REDO. This, however, may be so modified as to display only the text of a procedure that is designated by the user. For this purpose, a flag that can be set by the user to indicate whether the display be made or not is added to a correspondence table of procedure names and procedure name identifier (pid), in order to control the display of the text in compliance therewith.

Figure 1A:
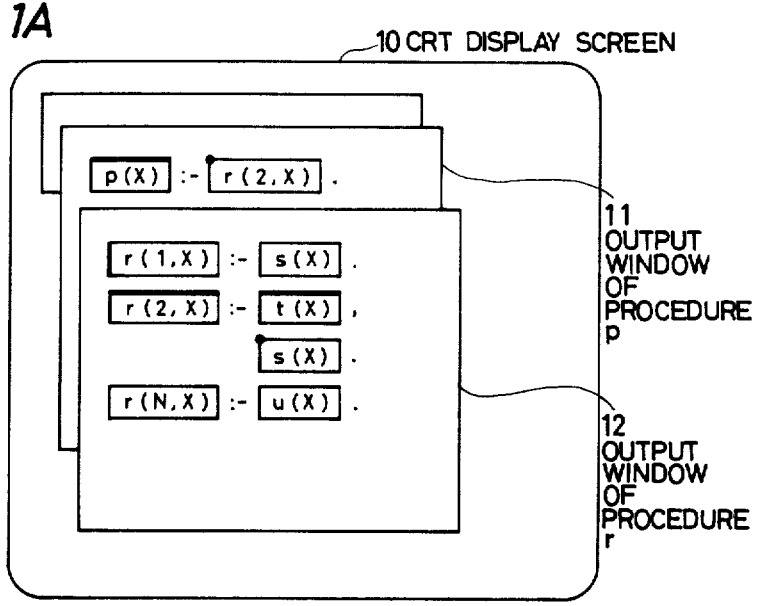
FIGS. 1A–1C is a diagram showing the display screen obtained according to an embodiment of the present invention.
Figure 1B:
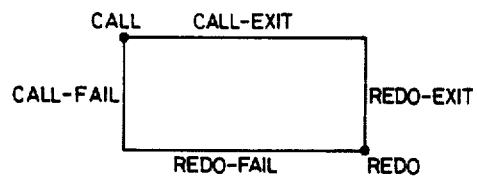

FIG. 1A shows a CRT screen on which the trace same as that of FIG. 11 for the program of FIG. 4 is displayed based upon the aforementioned embodiment. In this example, however, texts of the procedures t, s and u are not displayed. FIG. 1B generally shows the display of the aforementioned control points. In FIG. 1A, output windows 11 and 12 are opened on the CRT screen 10. A text of the procedure p is displayed on the output window 11 in the CALL of the first line of FIG. 11, and CALL is displayed at the head term p(X) in the next UCALL, which is then converted into CALL-EXIT in the next UEXIT. In the CALL of the fourth line, call is displayed at the second term r(2, X) of the sentence of the procedure p, a text of the procedure r is displayed on the output window 12, and CALL is displayed at the head term r(1, X) of the first sentence in the next UCALL. The display of the head term changes into CALL - FAIL in the UFAIL of the sixth line, the CALL - EXIT is displayed at the head term of the second sentence of the procedure r in the UEXIT of the eighth line, and the CALL is displayed at the second term t(X) of the second sentence in the next CALL. In this case, if the display is not suppressed, the text of the procedure t is displayed on the new window. The CALL-EXIT is displayed at the second term t(X) of the second sentence in the EXIT of the twelfth line, and the CALL is displayed at the third term s(X) of the second sentence in the CALL of the last line. Display of text of the procedure is suppressed.

The following facts can be easily comprehended from the observation of the present screen that is diagrammed. That is, the procedure r is now being processed; the present point of execution is the CALL point of term s(X); the first term of the first sentence of the procedure r is fail-terminated until the point of execution is reached, and the first and second terms of the second sentence are success-terminated; and control is handed over to the term s(X) for the first time.

Figure 1C:
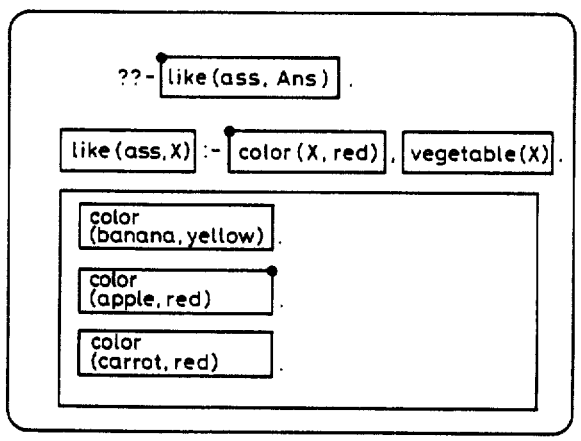

This embodiment displays which clause of which procedure has made the call until the present point of execution is reached. It is, however, also allowable to provide a display output window which displays only the clause of the calling source, in order to successively display on the window the sequences of clauses of calling sources. FIG. 1C illustrates an example where the user program of FIG. 4B is displayed by this display method. According to this display method, "color(X, red)" is now examined in order to verify the clause "like(ass, X): -color(X, red), vegetable(X)", i.e., to clarify the object of calling "color(X, red)". At this moment, "color(apple, red) is selected for this call because of the reason that there exists no clause in which the second argument of the head is "red" before the clause "color(apple, red)". That is, there is clarified the reason for selecting "color(apple, red)" as a result of calling.

In this embodiment, the display stack 52 is provided exclusively for the trace display part 35. Here, however, it is also allowable to provide a region for trace display control to the inference execution stack used by the inference part 34, to store in the above trace display control region the information that would have been stored in the display stack 52, thereby to use the stack which also serves as the trace display stack 35. It is further allowable to surround all vertexes by a box-like figure from the first time to display the control points by flashing, thick lines or by any other emphasizing indication. Or, the unexecuted terms may not be surrounded by the box-like figure, and the control points for the executed vertexes only may be displayed. The manner of displaying the control points is not limited to that of the above-mentioned embodiment only but may be effected by using any symbol that can be displayed around each of the terms.

According to the present invention, the display of clause call sequence and the display of all clauses in a procedure inclusive of the selected clause, are effected simultaneously making it possible to easily and simultaneously infer the object of clause selection and the reason of clause selection and contributing to improving the efficiency in the operation for debugging the program. Moreover, the present points of program execution in the logic language program and the execution status up to these points, are displayed on the source list of the form described by the programmer in a manner that can be readily comprehended. Therefore, the process for executing the logic language program, that is usually difficult to comprehend, can be easily grasped and, hence, the debugging efficiency can be improved strikingly.

What is claimed is:

1. A method for displaying an execution trace of a program described in a logic programming language, said program including at least one procedure, the method comprising the steps of:

executing the program in a data processing apparatus;
   displaying terms of a program source list of the procedure that is called; and
   graphically displaying a present point of execution on the displayed program source list during the execution of the program.

2. A method of displaying the execution trace according to claim 1, wherein the step of graphically displaying the present point of execution includes a four sided figure having at least four vertexes that surrounds at least one of the terms of the program list, at least one part of the four sides and four vertexes thereof representing a present execution status of the program.

3. A method of displaying the execution trace according to claim 2, wherein said execution status includes call, recall, success termination and fail termination after the call, and success termination and fail termination after the recall, two vertexes of said four-sided figure corresponding to said call and said recall, respectively, and the four sides of said four-sided figure corresponding to the success termination and fail termination after the call, and to the success termination and fail termination after the recall, respectively.

4. A method of displaying the execution trace according to claim 1, wherein provision is made for a renew step to review the display control information for a related procedure in response to an execution status information that shows the present execution status in the program execution process, and wherein the displaying is controlled based upon said execution status information and the display control information.

5. A method of displaying the execution trace according to claim 4, wherein said display control information includes a plurality of information blocks used for controlling the execution status of display of each of the procedures and pointer information for designating which one of said plurality of information block is to be used, and wherein said renewal step includes a step for forming a new information block, a step for changing the content of the existing information block, and a step for changing said pointer information.

6. A method of displaying execution trace according to claim 5, wherein information block includes a part that indicates a corresponding procedure, a part that indicates a calling relationship among the procedures, a part that indicates a term to be processed, and a part that indicates at least a portion of the execution history.

7. A method for displaying an execution trace of a program described in a logic programming language, said program including at least one procedure containing clauses, the method comprising the steps of:

executing the program in a data processing apparatus;
   simultaneously displaying a sequence of calling clauses that are successively called and all clauses in the procedure to be called, on a display unit; and
   displaying a present point of execution of the program so as to be overlapped on the abovesaid display unit, during the execution of the program.

* * * * *